(12) United States Patent
Bae et al.

(10) Patent No.: US 10,512,891 B2
(45) Date of Patent: *Dec. 24, 2019

(54) METHOD FOR MANUFACTURING ACTIVATED CARBON

(71) Applicants: Hyundai Motor Company, Seoul (KR); Inha-Industry Partnership Institute, Incheon (KR)

(72) Inventors: Shin Tae Bae, Hwaseong-si (KR); Young Jung Heo, Danyang-eup (KR); Soo Jin Park, Seoul (KR)

(73) Assignees: Hyundai Motor Company, Seoul (KR); Inha-Industry Partnership Institute, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,970

(22) Filed: Aug. 26, 2016

(65) Prior Publication Data

US 2017/0282153 A1    Oct. 5, 2017

(30) Foreign Application Priority Data

Apr. 5, 2016 (KR) .................. 10-2016-0041811

(51) Int. Cl.
| | | |
|---|---|---|
| *C01B 31/08* | (2006.01) | |
| *B01J 20/20* | (2006.01) | |
| *C01B 32/354* | (2017.01) | |
| *B01D 53/04* | (2006.01) | |
| *B01J 20/06* | (2006.01) | |
| *B01J 20/30* | (2006.01) | |
| *B01J 20/32* | (2006.01) | |
| *B60H 3/06* | (2006.01) | |

(52) U.S. Cl.
CPC .......... *B01J 20/20* (2013.01); *B01D 53/0407* (2013.01); *B01J 20/06* (2013.01); *B01J 20/3021* (2013.01); *B01J 20/3064* (2013.01); *B01J 20/3078* (2013.01); *B01J 20/3204* (2013.01); *B01J 20/3236* (2013.01); *B60H 3/06* (2013.01); *C01B 32/354* (2017.08); *B01D 2253/102* (2013.01); *B01D 2257/504* (2013.01); *B60H 2003/0691* (2013.01)

(58) Field of Classification Search
CPC ............................ B01J 20/20; C01B 32/354
See application file for complete search history.

(56) References Cited

U.S. PATENT DOCUMENTS

| | | | |
|---|---|---|---|
| 8,741,243 B2 | 6/2014 | Gadkaree et al. | |
| 9,040,452 B2 * | 5/2015 | Kishimoto | H01M 4/90 |
| | | | 423/231 |

FOREIGN PATENT DOCUMENTS

| | | |
|---|---|---|
| JP | 2009-526743 A | 7/2009 |
| KR | 10-1123586 B1 | 2/2012 |
| KR | 10-1331112 B1 | 11/2013 |
| KR | 10-1350549 B1 | 1/2014 |
| KR | 10-2015-0074236 A | 7/2015 |
| KR | 10-1588768 B1 | 1/2016 |

OTHER PUBLICATIONS

Zhang Xianglan, et al. "Effect of activation agents on the surface chemical properties and desulphurization performance of activated carbon", Science china technological sciences, vol. 53, No. 9, Sep. 2010, pp. 2515-2520.

* cited by examiner

*Primary Examiner* — Stuart L Hendrickson

(74) *Attorney, Agent, or Firm* — Morgan, Lewis & Bockius LLP

(57) ABSTRACT

An activated carbon manufacturing method may include preparing activated carbon precursors, carbonizing the activated carbon precursors by performing a heat treatment on the activated carbon precursors, equalizing the activated carbon precursors carbonized, in the carbonizing, by grinding the activated carbon precursors, activating the activated carbon precursors by inserting an oxidizing agent and distilled water into the equalized activated carbon precursors and performing a heat treatment on the activated carbon precursors, and introducing metal oxide particles into the activated carbon precursors by mixing the activated precursors, a metal salt, and a reducing agent in a solvent to perform reaction on the activated carbon precursors.

22 Claims, 3 Drawing Sheets

METHOD FOR MANUFACTURING ACTIVATED CARBON

CROSS-REFERENCE TO RELATED APPLICATION

The present application claims priority to Korean Patent Application No. 10-2016-0041811, Apr. 5, 2016, the entire contents of which is incorporated herein for all purposes by this reference.

BACKGROUND OF THE INVENTION

Field of the Invention

The present invention relates to an activated carbon manufacturing method.

Description of Related Art

Currently, interest in environmentally friendly cars is increasing rapidly due to problems such as fossil fuel depletion and greenhouse gas exhaust causing a greenhouse effect. Especially in eco-friendly cars, a travel distance of the electric vehicle has emerged as an important issue.

For heating and cooling, unlike an internal combustion engine, the electric vehicle includes no waste heat source (engine coolant) for heating and no waste power for compressing a coolant. Accordingly, powers for a positive temperature coefficient (PTC) heater and for compressing the coolant are additionally required, and thus additional power is consumed. As a result, the travel distance is reduced by 30 to 50%.

Accordingly, it is necessary to minimize outdoor air introduction in order to preserve cold and warmth. In this case, the concentration of carbon dioxide in a vehicle is increased by carbon dioxide exhausted by passengers, and thus safety problems (2,000 ppm or more induces drowsiness, and 5,000 ppm causes a lapse into dyspnea) are generated.

As a result, studies to reduce the carbon dioxide included in the vehicle are ongoing. Currently, an air filter (including activated carbon) is applied to some high-end cars. However, this air filter can serve to remove harmful gasses such as volatile organic compounds (VOC), or fine dust, but it is difficult to remove carbon dioxide.

A conventional activated carbon manufacturing method is performed by carbonizing various vegetable materials such as coconut husks as precursors through a high temperature heat treatment under a non-activated environment, and by additionally performing a high temperature chemical or physical activation thereon to have a large number of pores. However, according to this conventional method, surface pore sizes of the manufactured activated carbon are diversified in a wide distribution range of micropores to macropores. As a result, pore uniformity is decreased. It is difficult to form ultra-micropores of one nm or less to have uniform distribution.

Accordingly, studies for improving an adsorptive capacity of carbon dioxide are being conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a manufacturing method of activated carbon, having advantages of being capable of improving selective adsorptive capacity of carbon dioxide by forming a large number of micropores and introducing metal oxide particles.

According to various aspects of the present invention, an activated carbon manufacturing method may include preparing activated carbon precursors, carbonizing the activated carbon precursors by performing a heat treatment on the activated carbon precursors, equalizing the activated carbon precursors carbonized, in the carbonizing, by grinding the activated carbon precursors, activating the activated carbon precursors by inserting an oxidizing agent and distilled water into the equalized activated carbon precursors and performing a heat treatment on the activated carbon precursors, and introducing metal oxide particles into the activated carbon precursors by mixing the activated precursors, a metal salt, and a reducing agent in a solvent to perform reaction on the activated carbon precursors.

The oxidizing agent may be selected from the group including $H_2O_2$, $HNO_3$, $O_3$, $N_2O$, $H_2SO_4$, $F_2$, $Cl_2$, and a combination thereof, in the activating.

A volume of the oxidizing agent may be in a range of 10% volume to 50% volume of a total of 100% volume of the oxidizing agent and the distilled water, in the activating.

The activating may be performed at a temperature in a range of 700° C. to 1000° C.

The activating may be performed while injecting a mixture of the oxidizing agent and the distilled water into the activated carbon precursors at a speed in a range of 1 ml/hr to 100 ml/hr.

The activating may be performed under a pressure in a range of 0 bar to 5 bar.

The activating may be performed for a time period in a range of 1 hr to 5 hrs.

In the introducing of the metal oxide particles, the metal salt may be selected from the group including nickel, manganese, cobalt, zinc, yttrium, copper, iron, and a combination of at least two thereof.

The metal salt may be selected from the group including manganese nitrate, magnesium nitrate, nickel sulfate, copper nitrate, and a combination thereof.

The introducing of the metal oxide particles may be performed at a temperature in a range of 80° C. to 120° C.

In the introducing of the metal oxide particles, the reducing agent may be selected from the group including formaldehyde (HCHO), sodium borohydroride, lithium aluminum hydride, and a mixture of at least two thereof.

In the introducing of the metal oxide particles, a mixing ratio of the metal salt may be in a range of 0.1% weight to 20% weight of a mixing ratio of 100% weight of the activated carbon precursors.

In the introducing of the nitrogen-based functional group, the solvent may be a hydroxyl group (—OH).

The solvent may be selected from the group including ethanol, ethyleneglycol, diethyleneglycol, polyethyleneglycol, 1,2-propanediol, dodacanediol, and a combination thereof.

The activated carbon manufacturing method may further include selecting the equalized activated carbon precursors using a sieve having a size in a range of 100 μm to 250 μm, after the equalizing.

The activated carbon manufacturing method may further include performing a heat treatment on the activated carbon precursors in air in a temperature in a range of 250° C. to 350° C., after the introducing of the metal oxide particles.

The equalizing may be performed using a ball mill, and a particle size of a ball used for the ball mill may be in a range of 1 mm to 20 mm.

A volume of the activated carbon precursor may be in a range of 0.1% volume to 40% volume of a total of 100% volume of the activated carbon precursor and the ball mill, in the equalizing.

A processing speed for the ball mill may be in a range of 100 rpm to 500 rpm, in the equalizing.

A processing time period for the ball mill may be in a range of 30 min to 5 hrs, in the equalizing.

The carbonizing may be performed at a temperature in a range of 700° C. to 1000° C.

In the preparing of the activated carbon precursor, the activated carbon precursors may be selected from the group including starch, coconut husks, citrus peel, coffee grounds, bamboo stems, and a combination thereof.

According to various embodiments of the present invention, it is possible to provide a manufacturing method of activated carbon capable of improving selective adsorptive capacity of carbon dioxide by forming a large number of micropores and introducing a metal oxide.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the various embodiments, the word "ultra-micropore" indicates a pore having a diameter of 1 nm or less. Further, the word "micropore" indicates a pore having a diameter of 2 nm or less. In addition, the word "mesopore" indicates a pore having a diameter that is in a range of more than 2 nm but less than or equal to 50 nm.

As described above, surface pore sizes of the conventional activated carbon are diversified in a wide distribution range of micropores to macropores. As a result, pore uniformity is decreased. Ultra-micropores of 1 nm or less are formed, which causes difficulties.

Accordingly, various embodiments of the present invention are directed to providing a manufacturing method of activated carbon, capable of improving selective adsorptive capacity of carbon dioxide by forming a large number of ultra-micropores and introducing a basic active site into an activated carbon surface.

Figure 1:
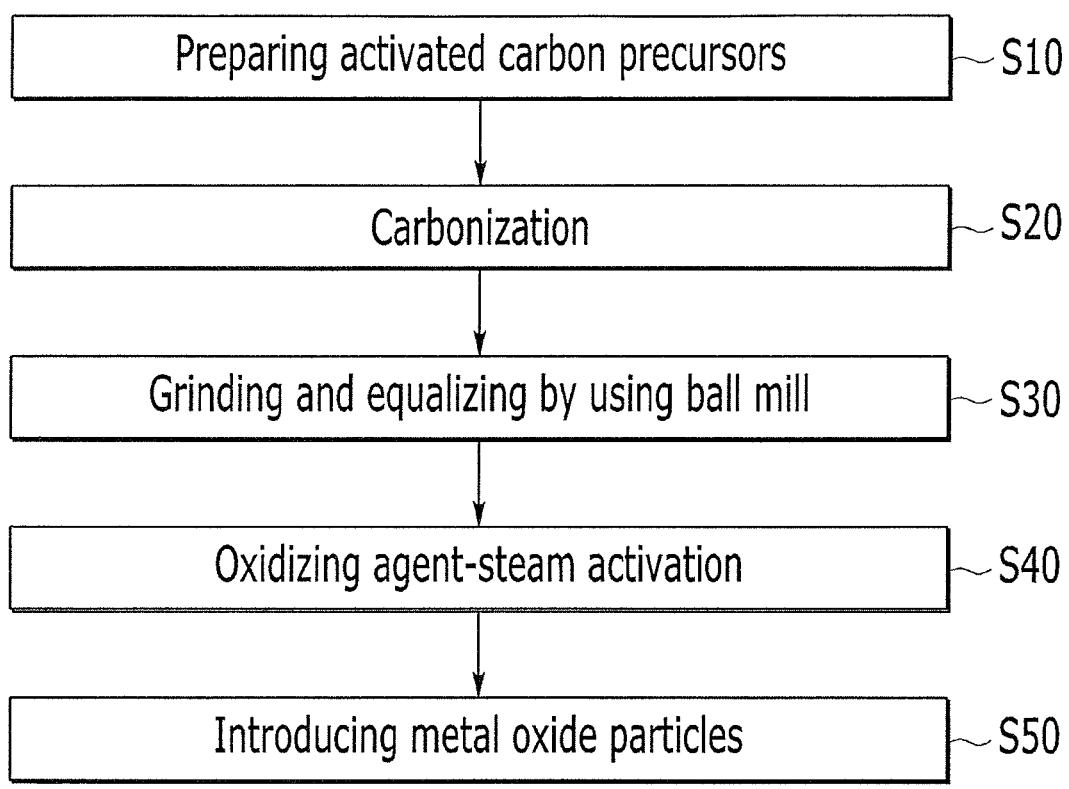
FIG. 1 is a schematic diagram illustrating an activated carbon manufacturing method according to various embodiments of the present invention.

FIG. 1 is a schematic diagram illustrating an activated carbon manufacturing method according to various embodiments of the present invention. Hereinafter, an activated carbon manufacturing method will be described with reference to FIG. 1.

According to various embodiments of the present invention, the activated carbon manufacturing method includes: preparing activated carbon precursors (S10), carbonizing the activated carbon precursors by using a heat treatment (S20), equalizing the activated carbon precursors carbonized in the carbonizing by grinding them (S30), activating the activated carbon precursors by inserting an oxidizing agent and distilled water into the equalized activated carbon precursors and performing a heat treatment thereon (S40), and introducing metal oxide particles into the activated carbon precursor surface by mixing the activated precursors, a metal salt, and a reducing agent in a solvent to perform reaction thereon (S50).

The grinding of the activated carbon precursors may be performed by using a ball mill. The grinding of the activated carbon precursors by using the ball mill facilitates equalizing size of particles thereof, thereby manufacturing high-quality activated carbon from which impurities are removed. However, the present invention is not limited thereto, but such a grinding operation may be performed by using any method that can execute uniform grinding, such as a milling method in addition to the method using the ball mill.

Further, the activated carbon precursors are activated by simultaneously using the oxidizing agent and the distilled water (oxidizing agent-steam activation) to increase the activity of steam molecules. Accordingly, it is possible to selectively increase a formation rate of ultra-micropores having a diameter of 1 nm or less on carbon surfaces. Thus, a specific surface area of the activated carbon and pore uniformity may be increased.

Hereinafter, each step of the manufacturing method and the manufactured activated carbon will be described.

In the preparing of the activated carbon precursors (S10), the activated carbon precursors may include starch, coconut husks, citrus peels, coffee grounds, bamboo stems, or a combination of any of the aforementioned. However, the present invention is not limited thereto, and any materials based on various vegetable matters can be employed as the activated carbon precursors. Such materials based on the inexpensive vegetable matters can reduce the manufacturing cost of the activated carbon.

The carbonizing of the activated carbon precursors by using a heat treatment (S20) may be performed in an inert gas atmosphere. The inert gas may include nitrogen or argon, but the various embodiments of present invention are not limited thereto.

A temperature of the heat treatment for the carbonizing may be in a range of 700° C. to 1000° C. The carbonizing may not be completed if it is performed at a temperature that is lower than 700° C. Since the carbonization is sufficiently performed in a temperature range of 700° C. to 1000° C., it is not necessary to perform the heat treatment at a temperature that exceeds 1000° C. In the case of the temperature that exceeds 1000° C., unnecessary costs may be generated, and the carbonization yield may be reduced.

The equalizing of the activated carbon precursors carbonized in the carbonizing by grinding them may be performed by using the ball mill, and materials of a ball used for the ball mill and a vessel of the ball mill may include stainless steel (SUS) or zirconia ($ZrO_2$), but the various embodiments of the present invention are not limited thereto.

A particle size of the ball used for the ball mill may be in a range of 1 mm to 20 mm. In the case that the size of the ball is too small, the yield may be rapidly reduced, and a relative content of impurities in particles may be increased. In contrast, in the case that the size of the ball is too large, particles having large sizes may be mainly formed, thereby reducing a ball mill effect.

A volume of the activated carbon precursors may be in a range of 0.1% volume to 40% volume of a total volume 100% volume of the ball used for the activated carbon precursors and the ball mill. In more detail, the volume of the activated carbon precursors may be in a range of 0.1% volume to 30% volume. In the case that the volume of the precursor is too large for the volume of the ball, the ball mill effect may be deteriorated. In contrast, in the case that the volume of the precursors is too small, heat generated in the ball mill may be increased, thereby reducing the yield.

A processing speed of the ball mill may be in a range of 100 rpm to 500 rpm. In the case that the processing speed of the ball mill is too quick, a reaction vessel may be excessively heated. In contrast, in the case that the processing speed of the ball mill is too slow, the ball mill effect may be reduced, thereby causing problems.

A processing time of the ball mill may be in a range of 30 min to 5 hrs. In the case that the processing time of the ball mill is too long, a general yield may be reduced, and a general particle size may be reduced. In contrast, in the case that the processing time of the ball mill is too short, the ball mill effect may be reduced, thereby causing problems.

The activated carbon manufacturing method may further include cleaning the precursor by using an acid in order to remove impurities, after the equalizing through the ball mill process. Herein, the acid used may include hydrochloric acid, nitric acid, or sulfuric acid, but various embodiments of the present invention are not limited thereto.

In addition, the activated carbon manufacturing method may further include selecting the equalized activated carbon precursors by using a sieve having a size that is in a range of 100 μm to 250 μm, after the equalizing and the acid cleaning. As such, it is possible to manufacture activated carbon capable of equalizing particle sizes, increasing a specific surface area, and removing impurities. The particle size uniformity of the activated carbon is an important factor when the activated carbon is manufactured to apply it to an actual product. For example, when being used for a water purifier filter, a vehicle air conditioner filter, a supercapacitor electrode, or the like, the activated carbon is modified into a pellet or granular shape by mixing it with a binder. In this case, if the particle sizes are not uniform, the performance may be deteriorated. As described above, in the case that the precursors are selected by using the sieve having a size that is in a range of 100 um to 250 um, it is possible to use them in a vehicle air conditioner filter.

The oxidizing agent employed in the activating of the activated carbon precursors by inserting an oxidizing agent and distilled water into the equalized activated carbon precursors and performing a heat treatment thereon (S40) may include $H_2O_2$, $HNO_3$, $O_3$, $N_2O$, $H_2SO_4$, $F_2$, $Cl_2$, another halogen-group oxidizing agent, or a combination thereof. $H_2O_2$ may be preferred, but the present invention is not limited thereto. As described above, the activated carbon precursors are activated by simultaneously using the oxidizing agent and the distilled water (oxidizing agent-steam activation) to increase the activity of steam molecules. Accordingly, it is possible to selectively increase a formation rate of ultra-micropores having a diameter of 1 nm or less on carbon surfaces. Therefore, a specific surface area of the activated carbon and pore uniformity may be increased. In addition, it is possible to easily introduce metal oxide particles at following steps by using an oxygen functional group such as a carbonyl group (C=O), a carboxyl group (—COOH), or a hydroxyl group (C—OH) introduced into the surface when the activation is performed by $H_2O_2$ or the like. Therefore, the process may be simplified, and its cost may be reduced without using an additional step for introducing the oxygen functional group.

Specifically, the activated carbon is conventionally formed to have 50 to 70% of micropores with a diameter 2 nm and a large amount (30 to 50%) of mesopores with a diameter of 2 to 50 nm. Accordingly, it is difficult to form ultra-micropores of 1 nm or less. However, as described above, it is possible to form a large number of ultra-micropores of 1 nm or less through the oxidizing agent-steam activation.

More specifically, as supported in the following examples, ultra-micropores having a diameter of 1.0 nm or less may be formed on a surface of the activated carbon through such activation. For example, sizes of the activated carbon may be in a range of greater than 0 up to 1.0 nm, greater than 0.3 nm up to 1.0 nm, greater than 0.3 nm up to 0.6 nm, 0.6 nm or less, greater than 0 nm up to 0.6 nm, 0.75 or less, greater than 0.3 nm up to 0.75 nm, or greater than 0 nm up to 0.75 nm. In this case, a total pore volume of the activated carbon surface may be in a range of 0.5 $cm^3$/g to 0.7 $cm^3$/g, and a pore volume of the ultra-micropores thereof may be in a range of 0.4 $cm^3$/g to 0.5 $cm^3$/g. Further, a volume of the ultra-micropore may be in a range of 67% volume to 83% volume of a total of 100% volume of pores of the activated carbon surface. The specific surface area can be greatly improved by using a high pore volume ratio of the ultra-micropores having a high pore volume ratio. Specifically, a specific surface area of Brunauer-Emmett-Teller (BET) of the activated carbon may exceed 672.7 $m^2$/g. More specifically, the specific surface area may be in a range of greater than 672.7 $m^2$/g to 1185.1 $m^2$/g.

In the activating, a volume of the oxidizing agent may be in a range of 10% volume to 50% volume of a total of 100% volume of the oxidizing agent and distilled water. For example, the volume of the oxidizing agent may be in a range of 5% volume to 50% volume, 5% volume to 40% volume, 5% volume to 35% volume, 5% volume to 25% volume, or 5% volume to 15% volume. As a ratio of the oxidizing agent is increased, a specific surface area is increased by an introducing ratio of an oxygen functional group into precursor surfaces and micropore development. However, if the ratio of the oxidizing agent is too high, a ratio of the micropores may be reduced, thereby reducing the specific surface area and the yield.

The activating may be performed at a temperature that is in a range of 700° C. to 1000° C. If the activating is performed at a temperature that is lower than 700° C., an activating effect may be reduced. If the activating is performed at a temperature that is higher than 1000° C., the yield may be sharply deteriorated.

The activating may be performed while injecting a mixture of an oxidizing agent and distilled water into a furnace, after the activated carbon precursors are inserted into the furnace. In this case, the mixture of the oxidizing agent and the distilled water may be inserted into the furnace into which the activated carbon precursors have been inserted at a speed that is in a range of 1 ml/hr to 100 ml/hr, and an internal pressure of the furnace may be adjusted in a range of greater than 0 bar up to 5 bar. The internal pressure of the furnace may be adjusted in a range of 2 bar to 5 bar. If the internal pressure of the furnace is too low, the activating effect may be reduced. In contrast, if the internal pressure of the furnace is too high, breakage of micropores and development of pores that are larger than the mesopores may be significantly increased, thereby reducing the specific surface area. In addition, as the pressure is increased, a carbonization yield may be reduced.

The activating may be performed for a time that is in a range of 1 h to 5 hrs. If an activating time is too long, the yield may be reduced, and a general structure of the pores of the material may be broken. In contrast, if the activating time is too short, an activating effect may be reduced.

According to various embodiments of the present exemplary embodiment, the activated carbon manufacturing method may further include introducing metal oxide particles into the activated carbon precursor surface by mixing the activated precursors, a metal salt, and a reducing agent in a solvent to perform reaction thereon. In the aforementioned oxidizing agent-steam activation, the carbon dioxide adsorptive capacity may be reduced by introduction of an acidic site 6+ caused by the oxidizing agent. However, in the case of using an additional reducing step of a surface functional group, the basicity may be increased by introducing a metal oxide that is beneficial to carbon dioxide adsorption into a surface thereof, thereby improving a carbon dioxide adsorptive capacity. In this case, as described above, it is possible to more easily introduce metal oxide particles by using an oxygen functional group formed on the surface, in the activating.

In the introducing of the metal oxide particles, the metal salt may include nickel, manganese, cobalt, zinc, yttrium, copper, iron, or two or more of the aforementioned. Further, the metal salt may further include metallic nitrate, metallic citrate, metallic hydroxide salt, metallic sulfate, or a mixture of two or more of the aforementioned. The metal salt has a high solubility for a solvent such that the reaction mixture may be easily formed.

In more detail, the metal salt may include maganese nitrate, magnesium nitrate, nickel sufate, copper nitrate, or a combination thereof.

In the introducing of the metal oxide particles, a mixing ratio of the metal salt may be in a range of 0.1% weight to 20% weight of a mixing ratio of 100% weight of the activated carbon precursors. In more detail, the mixing ratio of the metal salt may be in a range of 0.1% weight to 15% weight, 5% weight to 15% weight, 5% weight to 10% weight, or 0.1% weight % to 10% weight. As an amount of the metal salt is increased, the carbon dioxide adsorption site of the manufactured activated carbon may be increased. In contrast, formation of micropores may be deteriorated.

The introducing of the metal oxide may be performed by mixing the precursors, the metal salt, and the reducing agent in the solvent and then performing a heat treatment thereon. In this case, a temperature of the heat treatment may be in a range of 80° C. to 120° C. or 90° C. to 110° C. An introducing effect of the metal oxide may be maximized in this range.

In the introducing of the metal oxide particles, the reducing agent may include formaldehyde (HCHO), sodium borohydride, lithium aluminum hydride, or a mixture of two or more kinds thereof. The reducing agent may serve to reduce metal ions included in the metal salt, and the reduction may be performed in a hydrogen ion concentration (pH) that is in a range of 11 to 14, or 11.5 to 12.5. When a strong base condition is satisfied by increasing the hydrogen ion concentration (pH), as a reduction reaction speed is increased by the reducing agent, a diameter of the metal particles may be decreased. Accordingly, it is possible to easily control a size of the metal particles by adjusting the hydrogen ion concentration. An example of a method of adjusting the hydrogen ion concentration is not significantly limited. For example, the method of adjusting the hydrogen ion concentration may be executed by adding alkali while mixing the reaction mixture, the metal salt, and the reducing agent which are subjected to the heat treatment in a temperature that is in a range of 800° C. to 1000° C. An example of the alkali may include sodium hydroxide (NaOH) or the like.

In the introducing of the metal oxide particles, a compound containing a hydroxyl group (—OH) may be employed as the solvent. For example, an ethanol solvent or a polyol solvent may be employed. However, the present invention is not limited thereto. In more detail, a solvent of pH 7 or more containing a hydroxyl group (—OH). Accordingly, it is possible to easily control dispersibility between solutes by improving a size of metal particles. Non-limited examples of the solvent of pH 7 or more containing the hydroxyl group (—OH) may include ethanol, ethyleneglycol, diethyleneglycol, polyethyleneglycol, 1,2-propanediol, dodacanediol, and a mixture of two or more of the aforementioned.

In addition, the activated carbon manufacturing method may further include performing a heat treatment thereon in the air in a temperature that is in a range of 250° C. to 350° C., after the introducing of the metal oxide particles. As the performing of the heat treatment thereon in the air in the temperature that is in the range of 250° C. to 350° C. is further included, the metal particles introduced into the activated carbon surface is oxidized to form metal oxide particles. The metal oxide may show basicity, and thus the selective adsorptive capacity of carbon dioxide can be improved through an acid-base reaction with carbon dioxide. Specifically, the heat treatment may be performed in a temperature that is in a range of 250° C. to 350° C. or 270° C. to 330° C. for 0.5 min to 5 min or 0.8 min to 2 min.

The following examples illustrate the present invention in more detail. However, the following exemplary embodiments are for illustrative purposes only, and the scope of the various embodiments of the present invention is not limited thereto.

EXAMPLES

Comparative Example 1

A sample was obtained by inserting vegetable-based activated carbon precursors (starch) into a tubal furnace, heating them to 800° C. at a temperature-increasing speed of 2° C./min, and maintaining them for 90 min to carbonize them. Then, it was cooled to room temperature. Thereafter, the sample was cleaned one or two times by using a 1 M hydrochloric acid solution and distilled water, and then was completely dried at 120° C. for 12 hrs.

The carbonized activated carbon precursors were then ground, sequentially cleaned by using a 1 M hydrochloric acid solution, and dried in a vacuum oven, to obtain activated carbon. In the ball mill grinding, zirconia balls having diameters of 5 mm and 10 mm were mixed (5 mm:10 mm=30% volume:70% volume) to be used, and the grinding was performed at 360 rpm for 1 hr. Further, a volume of the activated carbon precursors was set to 30% volume of a total of 100% volume of the balls used for the activated carbon precursors and ball mill.

Comparative Example 2

A sample was obtained by inserting vegetable-based activated carbon precursors (starch) into a tubal furnace, heating them to 800° C. at a temperature-increasing speed of 2° C./min, and maintaining them for 90 min to carbonize them. Then, it was cooled to room temperature. Thereafter, the sample was cleaned one or two times by using a 1 M hydrochloric acid solution and distilled water, and then was completely dried at 120° C. for 12 hrs.

The carbonized activated carbon precursors were then ground, sequentially cleaned by using a 1 M hydrochloric acid solution, and dried in a vacuum oven. In the ball mill grinding, zirconia balls having diameters of 5 mm and 10 mm were mixed (5 mm:10 mm=30% volume:70% volume) to be used, and the grinding was performed at 360 rpm for 1 hr. Further, a volume of the activated carbon precursors was to set as 30% volume for a total of 100% volume of the balls used for the activated carbon precursors and ball mill.

Thereafter, carbonized starch was uniformly spread in an alumina boat and positioned in a tubal furnace.

Next, after the sample was heated to 800° C. at a temperature-increasing speed of 2° C./min under a nitrogen ($N_2$) atmosphere, the supply of nitrogen ($N_2$) gas was stopped, and distilled water was injected at a speed of 6 ml/hr to be activated while maintaining an internal pressure of the furnace for 1 hr.

Thereafter, the sample was cleaned one or two times by using a 1 M hydrochloric acid solution and distilled water, and then was completely dried at 120° C. for 12 hrs, to obtain activated carbon.

Example 1

A sample was obtained by inserting vegetable-based activated carbon precursors (starch) inserted into a tubal furnace, heating them to 800° C. at a temperature-increasing speed of 2° C./min under a nitrogen ($N_2$) gas atmosphere, and maintaining them for 90 min to carbonize them. Then, it was cooled to room temperature. Thereafter, the sample was cleaned one or two times by using a 1 M hydrochloric acid solution and distilled water, and then was completely dried at 120° C. for 12 hrs.

The carbonized activated carbon precursors were then ground, sequentially cleaned by using a 1 M hydrochloric acid solution, and dried in a vacuum oven. In the ball mill grinding, zirconia balls having diameters of 5 mm and 10 mm were mixed (5 mm:10 mm=30% volume:70% volume) to be used, and the grinding was performed at 360 rpm for 1 hr. Further, a volume of the activated carbon precursors was to set as 30% volume for a total of 100% volume of the balls used for the activated carbon precursors and ball mill.

Then, the ground precursors were selected by using a 150 μm sieve. Thereafter, carbonized starch was uniformly spread in an alumina boat and positioned in a tubal furnace.

Next, after the sample was heated to 800° C. at a temperature-increasing speed of 2° C./min under a nitrogen ($N_2$) atmosphere, the supply of nitrogen $N_2$ gas was stopped, and a material obtained by mixing hydrogen peroxide (oxidizing agent) and distilled water at a volume ratio (10:90, oxidizing agent:distilled water) was injected at a speed of 6 ml/hr to be activated while maintaining an internal pressure of the furnace for 1 hr.

Thereafter, dried activated carbon was cleaned one or two times by using a 1 M hydrochloric acid solution and distilled water, and then was completely dried at 120° C. for 12 hrs, to obtain activated carbon. 10 g of the dried activated carbon was inserted into an ethylene glycol solution in which 1 g of a mixture of nickel nitrate and nickel sulfate was dissolved, and then the solution was agitated for 1 hr.

Next, pH of the solution was adjusted in a range of 10 to 12 by using a sodium hydroxide (NaOH) solution, and the solution was additionally agitated for 1 hr. Then, 3 ml of ormaldehyde (HCHO) was dripped, and the solution was agitated at 100° C. for 2 hr. Thereafter, it was cooled to room temperature, and was cleaned/dried by using ethanol 5 times.

Thereafter, the activated carbon into which metal oxide particles was subjected to an oxidation treatment at 300° C. in the air environment in the tubal furnace, to obtain a final form of the activated carbon.

EXPERIMENTAL EXAMPLES

Experimental Example 1

77K/nitrogen adsorption experiment was performed by using BELSORP MAX equipment made in Japan by BELSORP company. This result is shown in Table 1.

A deriving operation of data in Table 1 is as follows. A specific surface area is derived by using a Brunauer-Emmett-Teller (BET) formula. A total pore volume is calculated by using an adsorptive curve up to a relative pressure of 0.990, a micropore volume is derived by using a Dubinin-Radushkevich (D-R) formula, and a volume of mesopores is calculated by subtracting a volume of micropores from the total pore volume.

As shown in Table 1, formation of the micropores is further improved in the activated carbon of Example 1 performing oxidizing agent-steam activation using an oxidizing agent and distilled water than in Comparative Example 2 using distilled water.

TABLE 1

| Classification | BET specific surface area (m²g⁻¹) | Total pore volume (cm³g⁻¹) | Micropore volume (cm³g⁻¹) | Mesopore volume (cm³g⁻¹) | Micropore volume ratio (%) |
| --- | --- | --- | --- | --- | --- |
| Comparative Example 1 | — | — | — | — | — |
| Comparative Example 2 | 672.7 | 0.2763 | 0.2545 | 0.0218 | 92.0 |
| Example 1 | 763.6 | 0.3133 | 0.2963 | 0.0170 | 94.5 |

Experimental Example 2

Metal oxide introduction of an activated carbon surface was observed by using scanning electron microscope (SEM) equipment of SU8010 made in Japan by Hitachi company. This result is shown in FIG. 2.

Figure 2:
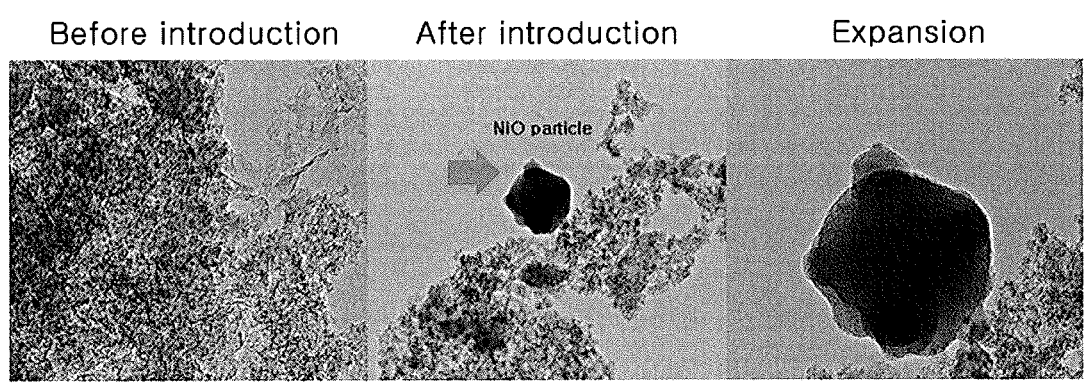
FIG. 2 is scanning electron microscope (SEM) pictures before and after metal oxide particles are introduced into an activated carbon surface.

As shown in FIG. 2, NiO particles of a material surface are introduced through a metal oxide introducing step, and have a size of about 10 mm.

Experimental Example 3

Figure 3:
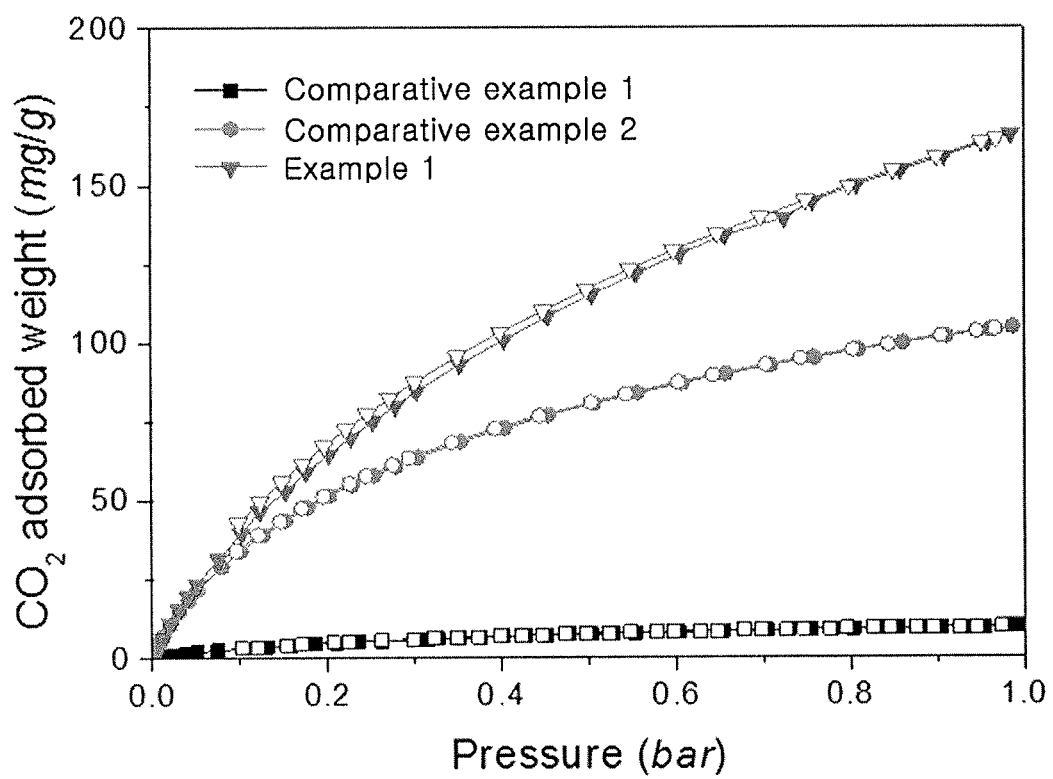
FIG. 3 illustrates data of measuring a carbon dioxide adsorptive capacity.

298K/carbon dioxide adsorbing experiment was performed by using BELSORP MAX equipment made in Japan by BELSORP company. This result is shown in FIG. 3. A solution obtained by mixing ethylene glycol and water at a ratio of 3:7 was inserted into a constant temperature oven to be maintained at 298 K, in order to maintain a room temperature state.

As shown in FIG. 3, in Comparative Example 1, a carbon dioxide adsorbing effect is hardly obtained. Further, it is seen that the carbon dioxide adsorbing effect of the activated carbon is improved in Example 1 using the oxidizing agent-steam activation and introducing nitrogen-based functional groups into the surfaces as compared with Comparative Example 2 using the steam activation.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An activated carbon manufacturing method comprising:
    preparing activated carbon precursors;
    carbonizing the activated carbon precursors by performing a heat treatment on the activated carbon precursors to form a carbonized material;
    equalizing the carbonized material, in the carbonizing, by grinding the carbonized material to form an equalized material;
    activating the equalized material by inserting an oxidizing agent and distilled water into the equalized material to form an activated material and performing a heat treatment on the activated material to form a heat-treated material; and
    introducing metal oxide particles into the heat-treated material by mixing the heat-treated material, a metal salt, and a metal oxide forming agent in a solvent to perform reaction on the heat-treated material and followed by oxidation treatment, thereby manufacturing the activated carbon.

2. The activated carbon manufacturing method of claim 1, wherein the oxidizing agent is selected from the group consisting of $H_2O_2$, $HNO_3$, $O_3$, $N_2O$, $H_2SO_4$, $F_2$, $Cl_2$, and a combination thereof, in the activating.

3. The activated carbon manufacturing method of claim 1, wherein a volume of the oxidizing agent is in a range of 10% volume to 50% volume of a total of 100% volume of the oxidizing agent and the distilled water, in the activating.

4. The activated carbon manufacturing method of claim 1, wherein the activating is performed at a temperature in a range of 700° C. to 1000° C.

5. The activated carbon manufacturing method of claim 1, wherein the activating is performed while injecting a mixture of the oxidizing agent and the distilled water into the carbonized material at a speed in a range of 1 ml/hr to 100 ml/hr.

6. The activated carbon manufacturing method of claim 5, wherein the activating is performed under a pressure in a range of 0 bar to 5 bar.

7. The activated carbon manufacturing method of claim 1, wherein the activating is performed for a time period in a range of 1 hr to 5 hrs.

8. The activated carbon manufacturing method of claim 1, wherein, in the introducing of the metal oxide particles, the metal salt is selected from the group consisting of nickel, manganese, cobalt, zinc, yttrium, copper, iron, and a combination of at least two thereof.

9. The activated carbon manufacturing method of claim 8, wherein the metal salt is selected from the group consisting of manganese nitrate, magnesium nitrate, nickel sulfate, copper nitrate, and a combination thereof.

10. The activated carbon manufacturing method of claim 1, wherein the introducing of the metal oxide particles is performed at a temperature in a range of 80° C. to 120° C.

11. The activated carbon manufacturing method of claim 1, wherein, in the introducing of the metal oxide particles and prior to the oxidation treatment, the reacting further comprises adding a reducing agent selected from the group consisting of formaldehyde (HCHO), sodium borohydroride, lithium aluminum hydride, and a mixture of at least two thereof.

12. The activated carbon manufacturing method of claim 1, wherein, in the introducing of the metal oxide particles, a mixing ratio of the metal salt is in a range of 0.1% weight to 20% weight of a mixing ratio of 100% weight of the activated carbon precursors.

13. The activated carbon manufacturing method of claim 1, wherein, in the introducing of the nitrogen-based functional group, the solvent comprises a hydroxyl group (—OH).

14. The activated carbon manufacturing method of claim 13, wherein the solvent is selected from the group consisting of ethanol, ethyleneglycol, diethyleneglycol, polyethyleneglycol, 1,2-propanediol, dodacanediol, and a combination thereof.

15. The activated carbon manufacturing method of claim 1, further comprising selecting the equalized carbonized material using a sieve having a size in a range of 100 μm to 250 μm, after the equalizing.

16. The activated carbon manufacturing method of claim 1, further comprising performing a heat treatment on the carbonized material in air in a temperature in a range of 250° C. to 350° C., after the introducing of the metal oxide particles.

17. The activated carbon manufacturing method of claim 1, wherein the equalizing is performed using a ball mill, and a particle size of a ball used for the ball mill is in a range of 1 mm to 20 mm.

18. The activated carbon manufacturing method of claim 17, wherein a volume of the carbonized material is in a range of 0.1% volume to 40% volume of a total of 100% volume of the carbonized material and the ball mill, in the equalizing.

19. The activated carbon manufacturing method of claim 17, wherein a processing speed for the ball mill is in a range of 100 rpm to 500 rpm, in the equalizing.

20. The activated carbon manufacturing method of claim 17, wherein a processing time period for the ball mill is in a range of 30 min to 5 hrs, in the equalizing.

21. The activated carbon manufacturing method of claim 1, wherein the carbonizing is performed at a temperature in a range of 700° C. to 1000° C.

22. The activated carbon manufacturing method of claim 1, wherein, in the preparing of the carbonized material, the carbonized material is selected from the group consisting of starch, coconut husks, citrus peel, coffee grounds, bamboo stems, and a combination thereof.

* * * * *